US012307772B2

(12) United States Patent
Vindler et al.

(10) Patent No.: US 12,307,772 B2
(45) Date of Patent: May 20, 2025

(54) SYSTEM AND METHOD FOR AUTOMATED FOREIGN MATERIAL EXCLUSION ATTENDANT

(71) Applicant: Siemens Energy, Inc., Orlando, FL (US)

(72) Inventors: Michael R. Vindler, Pittsburgh, PA (US); Zachary Franczyk, Oakmont, PA (US); Scott A. Karstetter, Monroeville, PA (US); Phani Ram Kumar Kuruganty, Robbinsville, NJ (US); Rajat Vikram Singh, Santa Clara, CA (US)

(73) Assignee: Siemens Energy, Inc., Orlando, FL (US)

( * ) Notice: Subject to any disclaimer, the term of this patent is extended or adjusted under 35 U.S.C. 154(b) by 440 days.

(21) Appl. No.: 17/654,706

(22) Filed: Mar. 14, 2022

(65) Prior Publication Data
US 2022/0301314 A1 Sep. 22, 2022

Related U.S. Application Data

(60) Provisional application No. 63/161,777, filed on Mar. 16, 2021.

(51) Int. Cl.
G06T 7/00 (2017.01)
G06F 16/51 (2019.01)
(Continued)

(52) U.S. Cl.
CPC .............. *G06V 20/50* (2022.01); *G06F 16/51* (2019.01); *G06F 16/5854* (2019.01);
(Continued)

(58) Field of Classification Search
CPC .... G06V 20/50; G06V 20/60; G06V 2201/06; G06V 10/255; G06F 16/51;
(Continued)

(56) References Cited

U.S. PATENT DOCUMENTS 8,953,889 B1 * 2/2015 Worley, III ....... G06F 16/24556
455/457
9,589,191 B2 * 3/2017 Stefanovic ........... G08G 1/0116
(Continued)

FOREIGN PATENT DOCUMENTS

CA 2559381 C * 8/2013 ......... G06K 9/00268
KR 20130071510 A * 7/2013

*Primary Examiner* — Carol W Chan

(57) ABSTRACT

A method to account for foreign material in a zone includes the steps of training an object detection model to identify an object using a set of database images of objects on a computer utilizing AI algorithms to create a trained object detection model, receiving an object in an area within a field of view of a camera, distinguishing whether the object is entering the foreign material zone or exiting the foreign material zone, and identifying the object using the trained object detection model. In response to the distinguishing step, the method includes storing the image in a log representing the objects in the foreign material exclusion zone in response to the object being identified by the AI-based trained object detection model when the object is entering he foreign material zone or removing the image from the log when the object is exiting the foreign material zone.

14 Claims, 6 Drawing Sheets

(51) Int. Cl.
*G06F 16/583* (2019.01)
*G06T 7/11* (2017.01)
*G06V 20/50* (2022.01)

(52) U.S. Cl.
CPC .............. *G06T 7/0004* (2013.01); *G06T 7/11* (2017.01); *G06T 2207/20081* (2013.01); *G06T 2207/20092* (2013.01)

(58) Field of Classification Search
CPC ..... G06F 16/5854; G06T 7/0004; G06T 7/73; G06T 7/11; G06T 2207/20081; G06T 2207/20092; G06T 2207/20084; G06T 2207/30108
See application file for complete search history.

(56) References Cited

U.S. PATENT DOCUMENTS

| | | | |
|---|---|---|---|
| 2018/0107880 A1* | 4/2018 | Danielsson | G08B 13/194 |
| 2018/0197624 A1* | 7/2018 | Robaina | A61B 90/37 |
| 2020/0097724 A1* | 3/2020 | Chakravarty | G06T 7/20 |
| 2021/0042996 A1* | 2/2021 | Das | G06T 7/75 |
| 2021/0142105 A1* | 5/2021 | Siskind | G06T 7/20 |
| 2021/0271704 A1* | 9/2021 | Suchkov | G06F 16/55 |
| 2022/0406065 A1* | 12/2022 | Kang | G06T 7/292 |

\* cited by examiner

SYSTEM AND METHOD FOR AUTOMATED FOREIGN MATERIAL EXCLUSION ATTENDANT

BACKGROUND

Foreign Material Exclusion (FME) is an activity during the service and maintenance of turbines and generators in power generation plants as well as other applications. Objects and materials that are left within the generators or turbines that are not intended to be there are often call foreign materials. Maintaining accountability of all items going into and out of controlled areas also called FME zones has historically been a challenging task. A piece of machinery such as turbine or a generator can be damaged by a small washer or a nut, for example, left behind loosely within the generator during a routine service. Failures in FME compliance can lead to accidents resulting in unexpected costs (e.g., equipment loss, loss of energy to households due to equipment downtime, etc.). Presently, the issue is addressed manually be employing human FME attendants who ensure the controlled area processes and procedures are followed to avoid any incidents.

BRIEF SUMMARY

A method to account for foreign material in a zone includes the steps of training an object detection model to identify an object using a set of database images of objects on a computer utilizing AI algorithms to create a trained object detection model, receiving an object in an area within a field of view of a camera, distinguishing whether the object is entering the foreign material zone or exiting the foreign material zone, and identifying the object using the trained object detection model. In response to the distinguishing step, the method includes storing the image in a log representing the objects in the foreign material exclusion zone in response to the object being identified by the AI-based trained object detection model when the object is entering he foreign material zone or removing the image from the log when the object is exiting the foreign material zone.

A system to account for foreign material in a foreign material exclusion zone includes an object detection module including a camera for capturing an image of an object in a field of view of the camera, an object recognition module operable to identify the object by processing the image using an AI-trained model, the model trained utilizing a database of images of objects, and a logging module for storing a record of the image as the object is moved into the foreign material exclusion zone or removing the record of the image when the object is moved out of the foreign material exclusion zone.

A system for controlling material within a material exclusion zone includes a processor, a memory storing instructions that, when executed by the processor, operate an AI-trained object detection module, a first sensor operable to capture material data for an object placed within a field of access of the sensor, the object detection module operable to analyze the material data and assign a label to the object, a material log stored in the memory and including a plurality of pairs of material data and labels indicative of the objects within the material exclusion zone, the object detection module operable to add the material data and the label to the material log, and a second sensor separate from and spaced apart from the first sensor, the second sensor operable to capture second material data for an object placed within a field of access of the second sensor, the object detection module operable to compare the second material data to the material data stored in the material log and to remove the pair of material data and label from the material log when the second material data matches the material data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
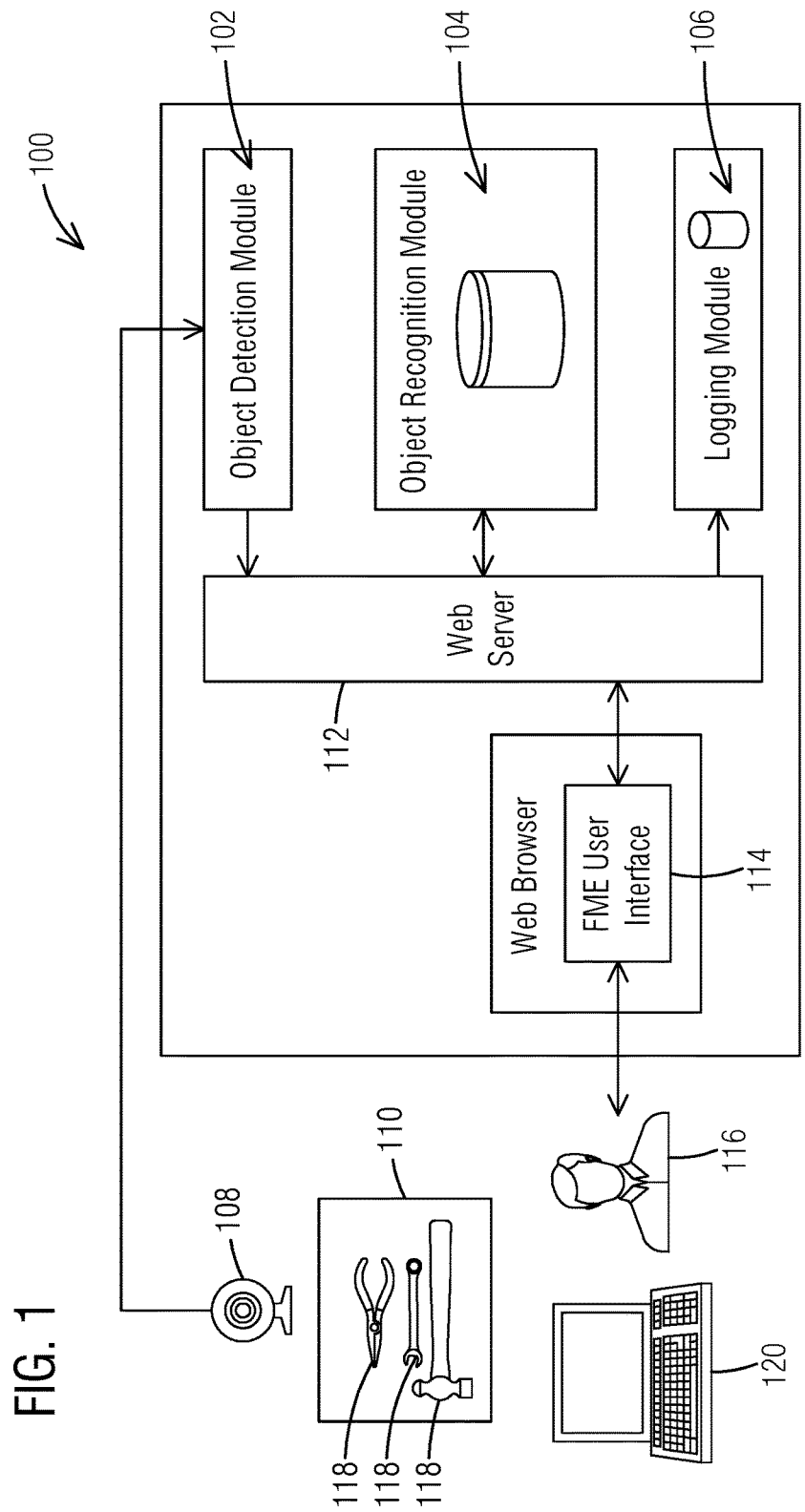
FIG. 1 is a schematic illustration of an Automated Foreign Material Exclusion Attendant System.

FIG. 1 illustrates the arrangement and operation of a foreign material exclusion attendant system 100 that includes aspects that are stored and run within a computer. As is well understood, the software aspects of the present invention could be stored on virtually any computer readable medium including a local disk drive system, a remote server, internet, or cloud-based storage location. In addition, aspects could be stored on portable devices or memory devices as may be required. The computer generally includes an input/output device that allows for access to the software regardless of where it is stored, one or more processors, memory devices, user input devices, and output devices such as monitors, printers, and the like.

The processor could include a standard micro-processor or could include artificial intelligence accelerators or processors that are specifically designed to perform artificial intelligence applications such as artificial neural networks, machine vision, and machine learning. Typical applications include algorithms for robotics, internet of things, and other data-intensive or sensor-driven tasks. Often AI (artificial intelligence) accelerators are multi-core designs and generally focus on low-precision arithmetic, novel dataflow architectures, or in-memory computing capability. In still other applications, the processor may include a graphics processing unit (GPU) designed for the manipulation of images and the calculation of local image properties. The mathematical basis of neural networks and image manipulation are similar, leading GPUs to become increasingly used for machine learning tasks. Of course, other processors or arrangements could be employed if desired. Other options include but are not limited to field-programmable gate arrays (FPGA), application-specific integrated circuits (ASIC), and the like.

The computer also includes communication devices that may allow for communication between other computers or computer networks, as well as for communication with factory devices such as machine tools, work-stations and the like.

Returning to FIG. 1, the foreign material exclusion attendant system 100 includes an object detection module 102, an object recognition module 104, and a logging module 106. One or more objects 118, such as tools or parts to be utilized to perform tasks on a system within a foreign material exclusion zone, may be placed on a tool tray 110. The tool tray 110 is positioned within a field of view of a camera 108. The camera 108 may be used to capture an image of the objects 118 placed on the tool tray 110 within the field of view of the camera 108. The object detection module 102 is utilized as a streaming service in which a continuous stream of live image data of the objects 118 placed on the tool tray 110 is captured. As used herein 'continuous' means that the images captured by the camera 108 are provided in real time to the system without any undue delay. The continuous stream of image data is provided via a web server 112 to the object recognition module 104.

The object recognition module 104 employs an AI-trained object detection model to self-identify the object 118 or objects 118. Before the object recognition module 104 can identify object 118, however, a trained object recognition model is developed. For example, a large database of object images may be used to develop the trained object recognition model. In an embodiment, the database of object images is a database of images of tools and parts that may be used in a foreign material exclusion zone. In a further embodiment, the database contains CAD models of objects instead of or in addition to the images. In some cases, the database includes 30,000 images or more. However, databases including fewer images could be employed as well. The training utilizes artificial intelligence and specifically computer vision algorithms to identify the tools with speed and accuracy. Computer vision is a specialized field of artificial intelligence and machine learning which allows a computer to interpret and understand the visual world employing algorithms which work with visual and spatial sensor data such as camera images, CAD models, lidar pointclouds, etc. Object detection aims to accurately identify and locate objects using models trained on large sets of images of same or similar objects.

Once the object 118 is identified, a logging module 106 visually logs the object 118 by storing an image of the object 118 in a log depicting the objects 118 within the foreign material exclusion zone. At this point, the object 118 is 'checked in' similar to a library system. The object 118 will remain 'checked-in' until it is 'checked-out' by the logging module 106. Once the object 118 is designated as being 'checked out', the logging module 106 will remove the image of the object from the log.

A user interface 114 may be provided for a user 116 to interact with the foreign material exclusion attendant system 100. The user interface 114 may include one or more display devices and one or more input devices 120 in operative connection with a processor or multiple processors of the foreign material exclusion attendant system 100. In an embodiment, the user interface 114 includes a graphical user interface (GUI) which permits multiple display windows to be presented in the graphical user interface simultaneously, with each display window providing an interface to a different application or to a different instance of the same application. A cursor or pointer in the graphical user interface may be manipulated by a user 116 through a pointing device such as a mouse or touch screen. The user interface 114 may be a part of a web browser such that the user 116 may interact with the world wide web for searching capability, for example. The user 116, through the use of the user interface 114, will denote whether the object 118 is being 'checked in' or 'checked out'.

When the object detection module 102 is unable to identify the object 118 utilizing the trained AI-detection model, the user 116 will receive a query on the user interface 114 for a label of the object 118. The unidentified image of the object may be stored for record keeping but not in the trained database. The image may then be logged by the logging module 106 into the log of objects in the foreign material exclusion zone. If desired, a retraining of the database images may be performed utilizing the object detection model so that the object detection module 102 can learn to recognize the object 118 in the future. The retraining may be done periodically or after a number of unrecognized parts occur as well.

Figure 2:
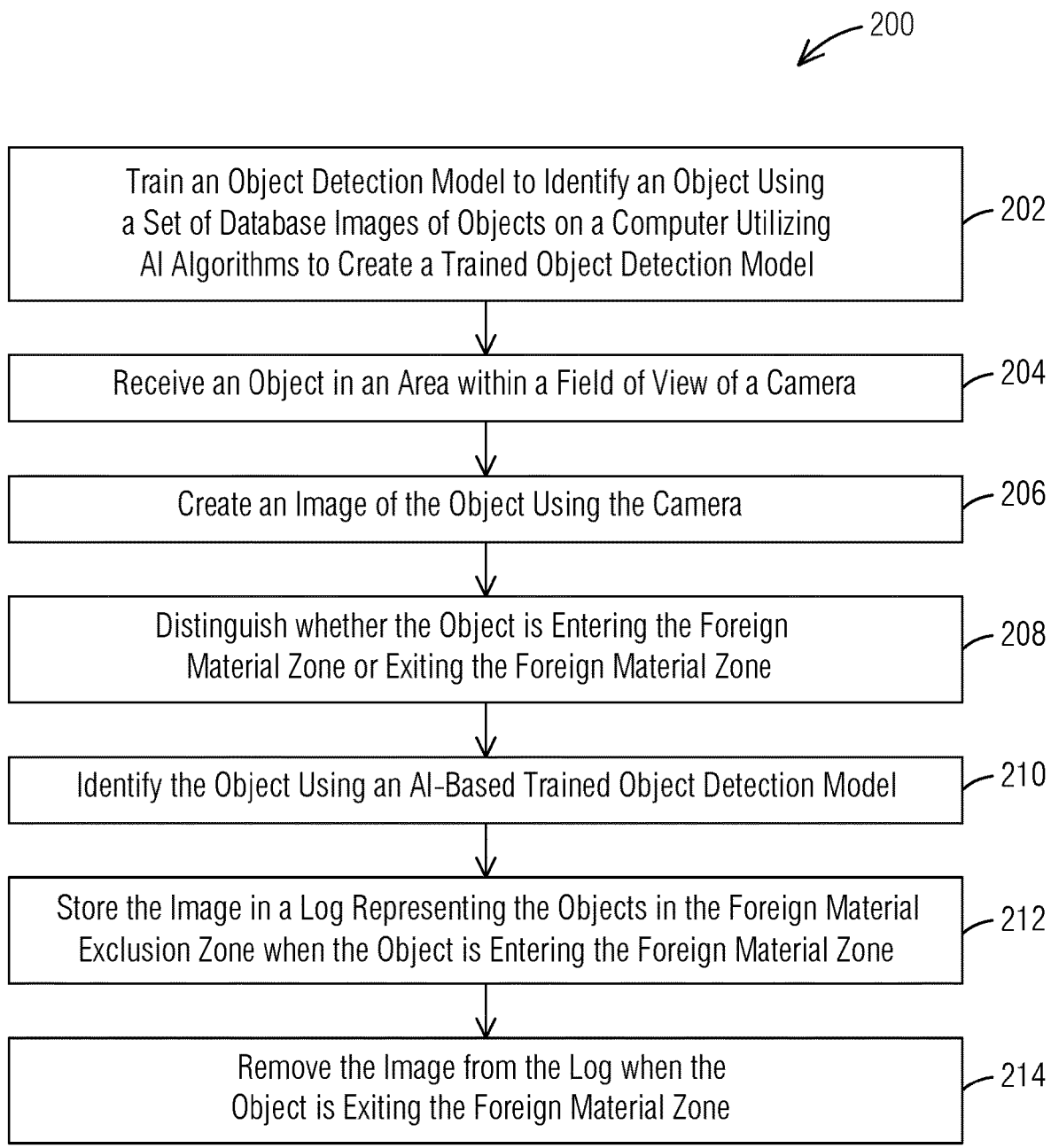
FIG. 2 is a flow chart of a method to account for foreign material in a zone.

FIG. 2 illustrates in a flow chart format a routine 200 that could be followed by the foreign material exclusion attendant system 100. In block 202, routine 200 trains an object detection model to identify an object using a set of database images of objects or CAD models of objects on a computer utilizing AI algorithms to create a trained object detection model. In block 204, routine 200 receives an object in an area within a field of view of a camera. In block 206, routine 200 creates an image of the object using the camera. In block 208, routine 200 distinguishes whether the object is entering the foreign material zone or exiting the foreign material zone. In block 210, routine 200 identifies the object using an AI-based trained object detection model. In block 212, routine 200 stores the image in a log representing the objects in the foreign material exclusion zone when the object being identified by the AI-based trained object detection model is entering the foreign material zone. In block 214, routine 200 removes the image from the log when the object is exiting the foreign material zone.

Figure 3:
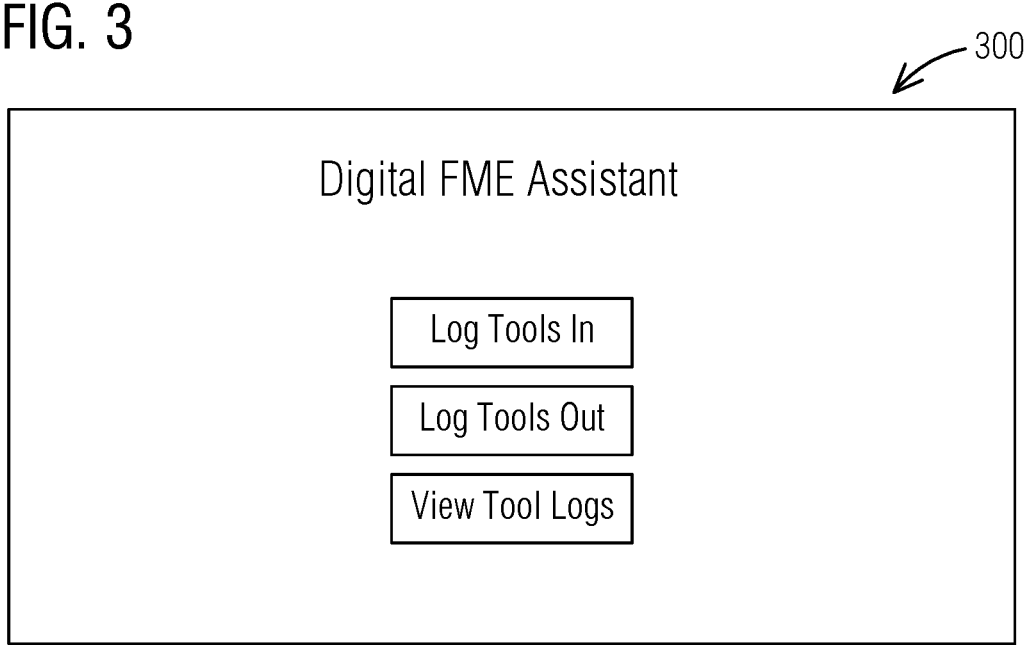
FIG. 3 is an example of a user interface that facilitates a checking in/checking out of an object.

FIGS. 3 through 9 illustrate aspects of the automated foreign material exclusion attendant system 100 and as well as some examples of the user interface 114. FIG. 3, for example, illustrates a user display screen 300. From the user display screen 300, a user 116 may log in an object 118, log out an object 118, and/or view the object log.

Figure 4:
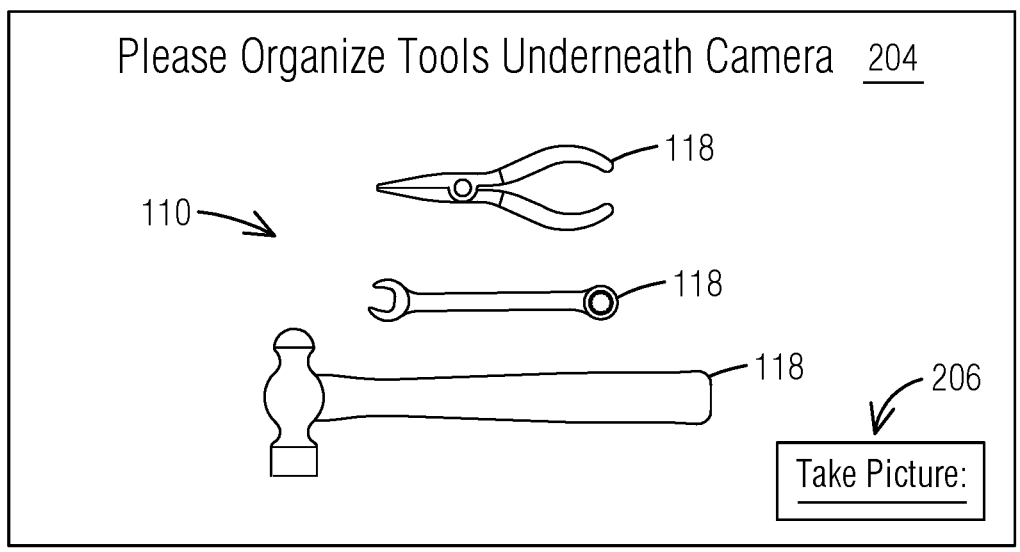
FIG. 4 is an example of a step of the method to account for foreign material in a zone.

FIG. 4 illustrates block 204 of routine 200 where the objects 118 are received on the tool tray 110 in an area within a field of view of the camera 108. When the user 116 has all the objects 118 for check in on the tool tray 110, an image may be taken according to block 206.

Figure 5:
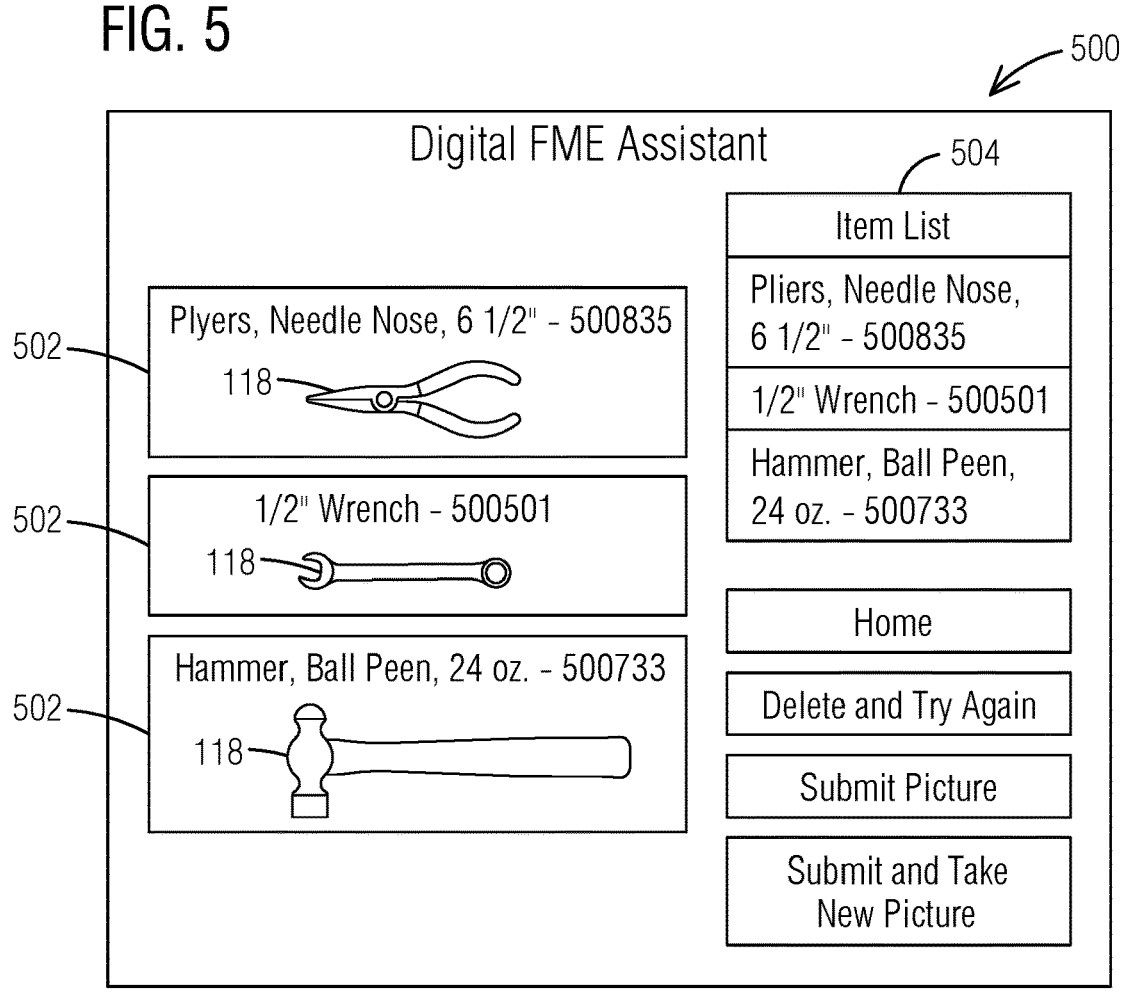
FIG. 5 is an example of a user interface that illustrates the system dividing up the objects into images.

In the case that multiple objects 118 are placed on the tool tray 110 and an image is taken of the objects 118, such as in the example of FIG. 4, the object recognition module 104 divides the image into a plurality of images 502, each image 502 with a single object 118 of the objects 118 placed on the tool tray 110 as shown by the user display screen 500 in FIG. 5. The object detection module 102 may process each image 502 to identify the objects 118 using the AI-trained object detection model. An item list 504 of the identified objects 118 may be shown by user display screen 500.

Figure 6:
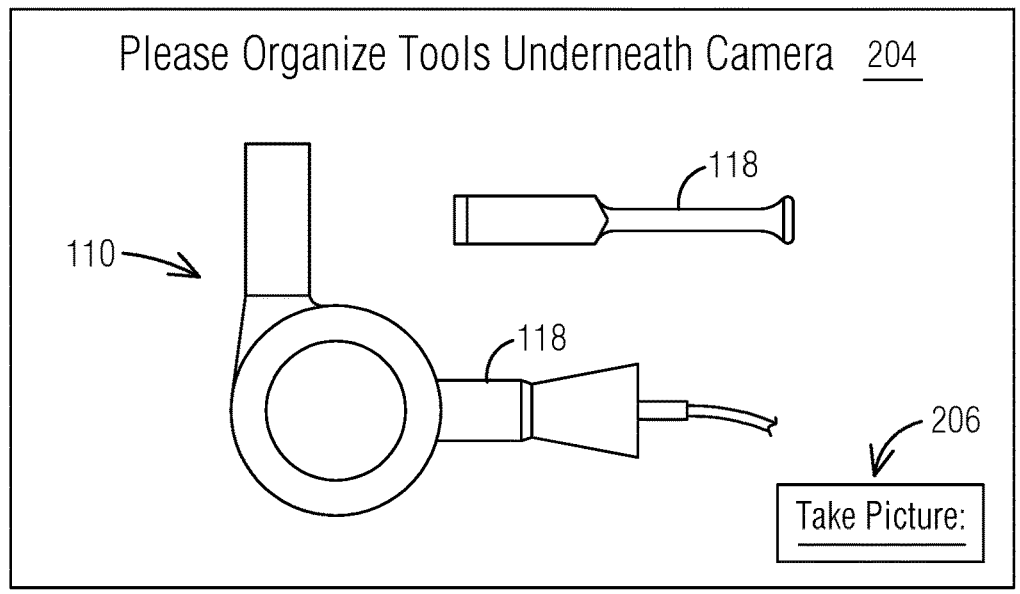
FIG. 6 is an example of a step of the method to account for foreign material in a zone.

FIGS. 6-9 illustrate another example use of the foreign material exclusion attendant system 100, specifically block 204 of routine 200. Two objects 118 are placed on the tool tray 110 in an area within a field of view of the camera 108 as illustrated in FIG. 6. When the user 116 has all the objects 118 for check in on the tool tray 110, the image 502 may be taken according to block 206.

Figure 7:
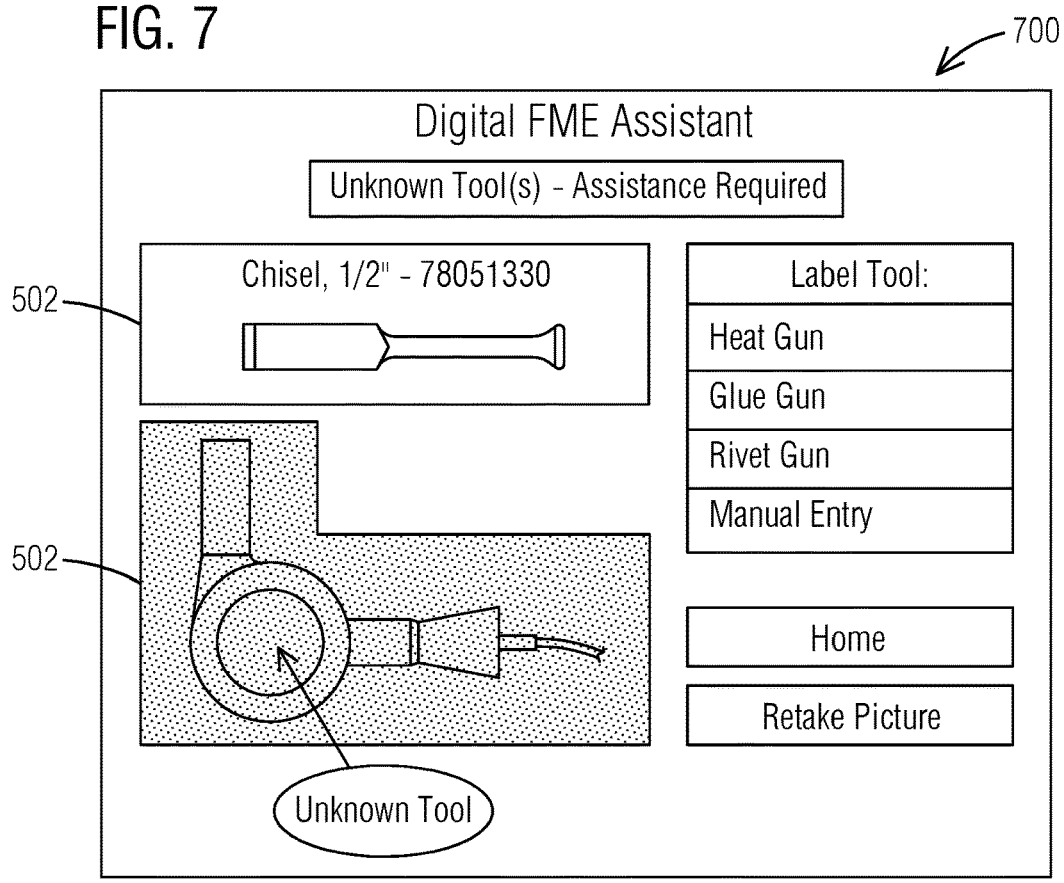
FIG. 7 is an example of a user interface that illustrates the system dividing up the objects into images with the result that one image is not identified.
Figure 8:
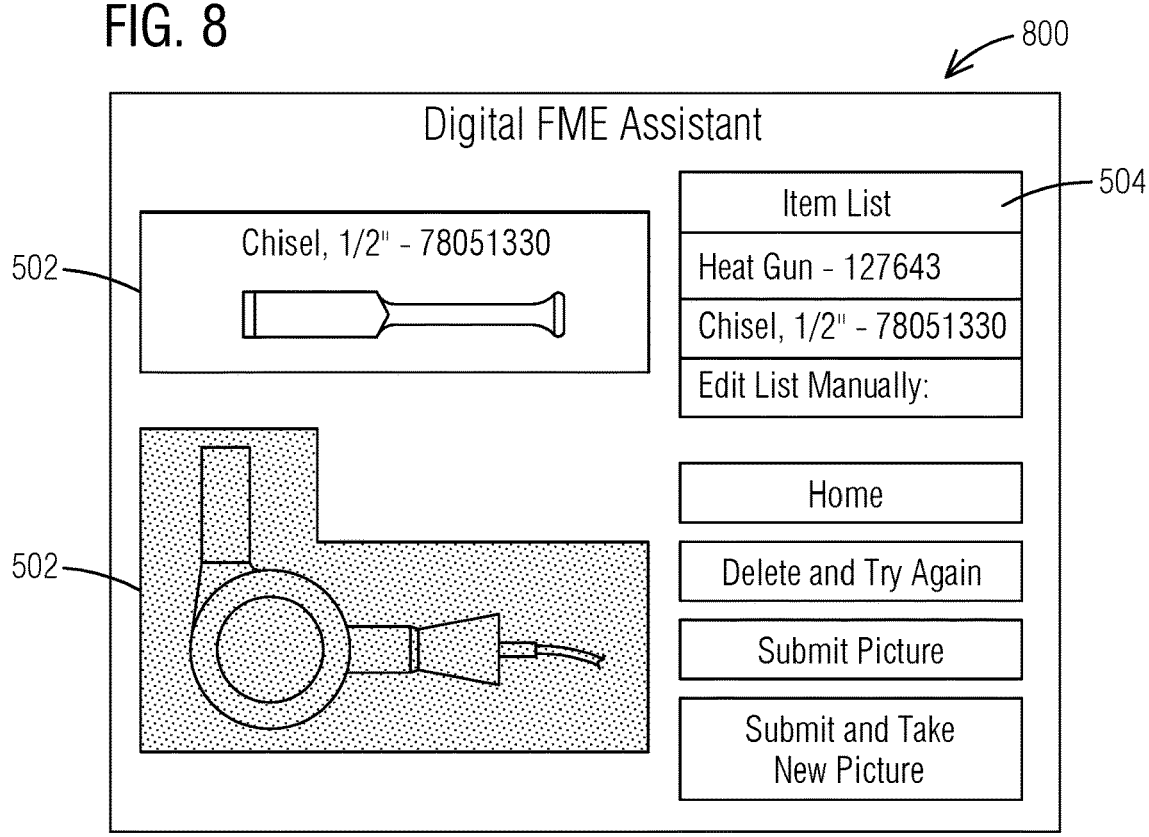
FIG. 8 is an example of a user interface that illustrates the system ready for submission into the log.

As shown in FIG. 7, the image is divided into separate images 502 for each of the two objects 118. The image object recognition module 104 processes each image 502 to identify the corresponding object 118 using the AI-trained model. In the example of FIGS. 6-9, one of the objects 118, chisel, has been identified by the AI-trained model and one of the objects 118 cannot be identified by the AI-trained model. In this case, the foreign material exclusion attendant system 100 responds via the user display screen 700 that the object 118 has not been identified by displaying Unknown Tool as shown. In addition, the foreign material exclusion attendant system 100 queries the user 116 by presenting a list of similar objects 118 that may be close to the image 502 of the object 118 in order to label the object 118. For example, in an embodiment, the user 116 starts typing in what is thought to be the name of the object. The system 100 will suggest tools that start with that key word. In the shown example, the user 116 is shown a list of a heat gun, a glue gun, a rivet gun, or has the opportunity to manually enter a label. The user 116, in this example, chooses the label of a heat gun. An image of the heat gun may then be added to the database of images and a retraining may take place in which the object detection model can recognize images of the new object in the future. From the user display screen 700, the user 116 may also choose to retake the picture in case he/she feels the picture may not have represented the object well.

Once labeled and identified, the objects 118 shown in the user display screen 800 (FIG. 8) are ready to be stored in the log of objects 118 in the foreign material exclusion zone. The users 116 may initiate this step from the user display screen by hitting the button Submit Picture. Other options presented to the user 116 on user display screen 800 include deleting the entry and starting over by hitting the Delete and Try Again Button or to Submit and start the method over with a new entry by hitting the button Submit and Take New Picture.

Figure 9:
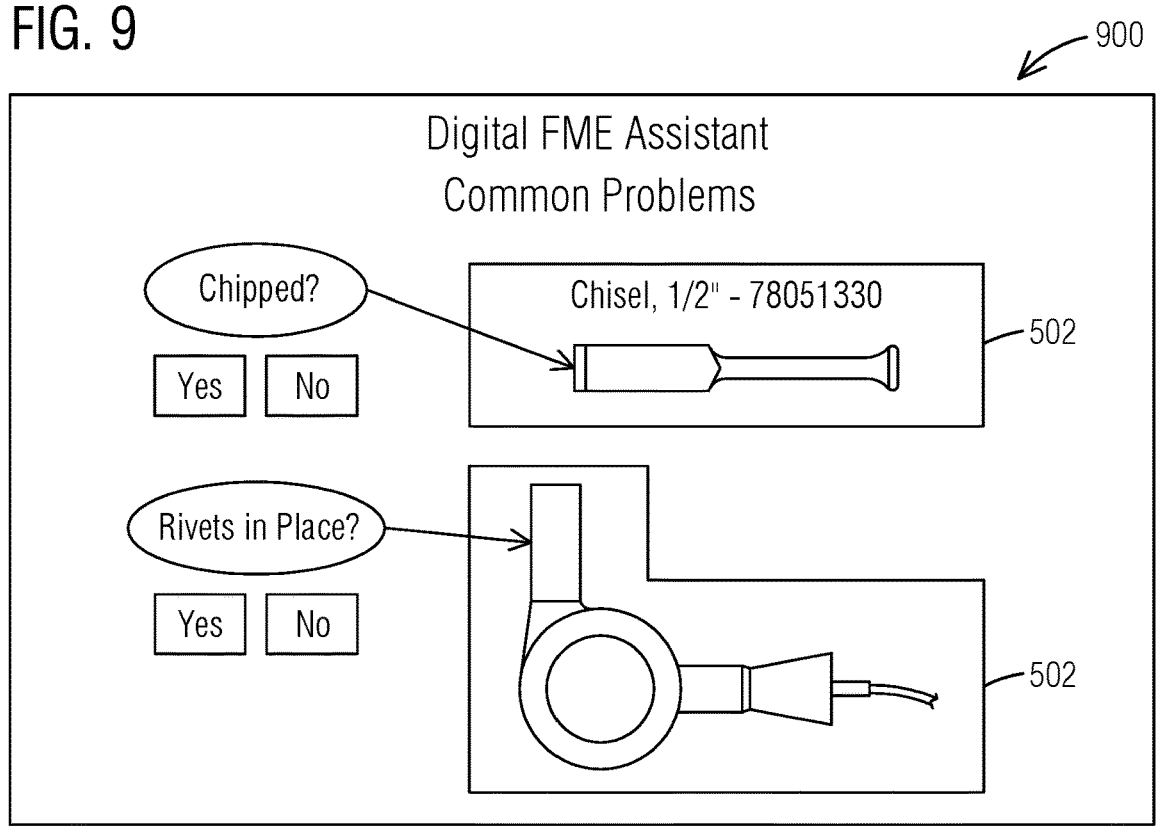
FIG. 9 is an example of a user interface that illustrates the system check for missing and damaged subcomponents.

In an embodiment, the method and foreign material exclusion attendant system 100 inspects each object 118 when it is being checked out of the foreign material exclusion zone. For example, the user display screen 900, shown in FIG. 9, is displaying the images 502 of the two objects 118 shown in the user display screens of FIG. 6-8, the chisel and the heat gun. The objects 118 have been placed in the tool tray 110 and the object detection module 102 has divided the image taken by the camera 108 into two images 502, one for each object 118. Utilizing RGB and depth sensors within the camera 108, the foreign material exclusion attendant system 100 can identify if subcomponents on the objects 118 are missing or damaged. RGB sensors utilize a 2D array of colors in the image and the depth sensor offer a point cloud data of pixel and the distance. This information from the sensors may be used to compare the current image to a pre-trained good/bad image of the object. Returning to FIG. 9, the foreign material exclusion attendant system 100 has determined that the chisel is chipped and checks that the rivets are in place on the heat gun. At this point the user 116 may return to user display screen 300 and log the objects 118 out of the foreign material exclusion zone. Upon clicking this Log Out Button, the image of the objects 118 will be removed from the log indicating that they are no longer in the foreign material exclusion zone.

Figure 10:
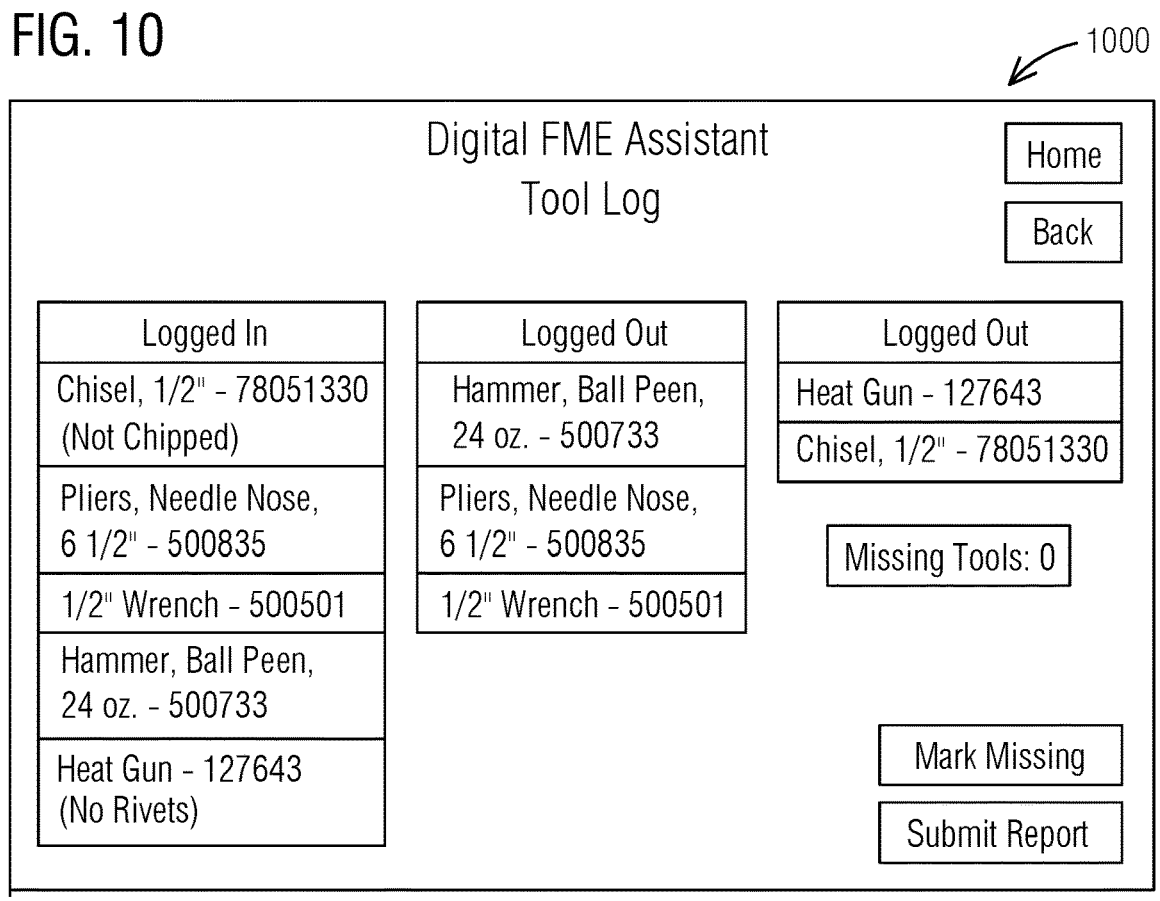
FIG. 10 is an example of a user interface that illustrates the system log.

FIG. 10 illustrates the user display screen 1000 displaying which objects 118 are logged in and which objects 118 have been logged out. The user display screen 1000 can also show which objects 118 are currently missing. A missing tool denotes an object that the object has been previously logged in but has not been logged out.

In operation, the user places the object 118 in the tool tray 110 within a field of view of the camera 108. The user 116 can then designate the object as being checked in or checked out. An image is taken by the camera 108 and utilized by the computer to identify the object 118 and add it to or remove it from the log. Sensors can also be employed to check the condition of the subcomponents on the objects to record the condition of the object and account for these parts as well.

Utilizing the foreign material exclusion attendant system keeps a complete and up to date inventory of all objects checked into/checked out of a foreign material exclusion zone. Any object that is left in the zone is easily and quickly identified. In the case of a gas turbine engine and an area surrounding it, defined as the foreign material exclusion zone, any tool or object identified in the zone may be removed before the gas turbine becomes operational thereby reducing the likelihood of an object harming the gas turbine.

In addition, the foreign material exclusion attendant system may be scaled up to easily cover multiple entrances and exits simultaneously thereby easing queues and improving response times at the foreign material zone entrances. This increases the accuracy of the log of the objects in the foreign material zone and removes human error. For example, one point could be designated for entry only with a second separate point designated as an exit.

Lastly, the foreign material exclusion attendant system offers flexibility by its ability to be deployed in both environments with no external connectivity (due to network security or lack of coverage) as well as a centrally manage service.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A method to account for a foreign material in a foreign material zone, the method comprising:
training an object detection model to identify an object using a set of database images of objects on a computer utilizing Artificial Intelligence (AI) algorithms to create an AI-based trained object detection model;
receiving the object in an area within a field of view of a camera;
creating an image of the object using the camera;
distinguishing whether the object is entering the foreign material zone or exiting the foreign material zone;
identifying the object using the AI-based trained object detection model;
inspecting the object to determine if the object includes a subcomponent to retrain and improve the AI-based trained object detection model; and
in response to the distinguishing step, one of:
storing the image in a log representing the objects in the foreign material zone in response to the object being identified by the AI-based trained object detection model when the object is entering the foreign material zone; and removing the image from the log when the object is exiting the foreign material zone.

2. The method of claim 1, wherein in response to the object not being identified by the AI-based trained object detection model, the method further includes:

querying a user for a label for the object;

adding the image to the set of database images with the label;

storing the image in the log representing the objects in the foreign material zone.

3. The method of claim 1, wherein the object is one of a plurality of objects positioned in the field of view of the camera, and wherein the image includes each of the plurality of objects, and wherein the identifying step further comprises dividing the image into a plurality of images with each image including an image of one of the plurality of objects, and identifying each object using the AI-based trained object detection model.

4. The method of claim 1, further comprising detecting a defect in the object and displaying a defect information to the user.

5. The method of claim 1, further comprising inspecting the object when the object is exiting the foreign material zone using sensors to determine if the object is missing the subcomponent.

6. The method of claim 1, wherein the object is a tool utilized for servicing a gas turbine and wherein the set of database images includes images of tools utilized for servicing a gas turbine object.

7. The method of claim 1, wherein the AI-based trained object detection model employs a computer vision algorithm.

8. A system to account for foreign material in a foreign material exclusion zone, the system comprising:

a processor, an object detection module including a camera for capturing an image of an object in a field of view of the camera;

an object recognition module operable to identify the object by processing the image using an Artificial Intelligence (AI) trained model, the AI-trained model trained utilizing a database of images of objects and inspect the object to determine if the object includes a subcomponent to retrain and improve the AI-trained model; and a logging module for storing a record of the image as the object is moved into the foreign material exclusion zone or removing the record of the image when the object is moved out of the foreign material exclusion zone.

9. The system of claim 8, wherein the object detection module provides a continuous live stream of data of captured images of the object.

10. The system of claim 8, further comprising a user interface for interfacing with the system, wherein a user interfaces with the system through the user interface by checking in the object into the foreign material exclusion zone or checking out the object from the foreign material exclusion zone.

11. The system of claim 10, wherein when the object is checking in to the foreign material exclusion zone, the image of the object is stored in a log representing the objects in the foreign material exclusion zone, the object is inspected when the object is exiting the foreign material exclusion zone using sensors to determine if the object is missing the subcomponent, and wherein when the object is checking out from the foreign material exclusion zone, the image of the object is removed from the foreign material exclusion zone.

12. The system of claim 11, wherein the log is accessible to the user by a display.

13. The system of claim 10, wherein the object recognition module includes an AI-based trained model that employs computer vision algorithms to identify the object.

14. The system of claim 10, wherein when the object recognition module cannot identify the object, the object detection module presents to a user images of objects that are similar to the object to label the object.

* * * * *